United States Patent [19]

Staar

[11] 3,716,678

[45] Feb. 13, 1973

[54] APPARATUS FOR CONTROLLING ADVANCE OF A RECORD SUPPORT AND TRANSVERSE DISPLACEMENT OF A SENSING HEAD

[76] Inventor: Marcel Jules Helene Staar, 479 Avenue Louise, Brussels, Belgium

[22] Filed: Nov. 9, 1970

[21] Appl. No.: 87,912

[52] U.S. Cl. ........................179/100.2 T, 179/100.2 S

[51] Int. Cl. ..........................G11b 21/04, G11b 27/26

[58] Field of Search .................179/100.2 T, 100.2 S; 340/174.1 C

[56] References Cited

UNITED STATES PATENTS

| | | | |
|---|---|---|---|
| 3,585,316 | 6/1971 | Kuller | 179/100.2 T |
| 3,229,035 | 1/1966 | Bounsall | 179/100.2 T |
| 3,124,360 | 3/1964 | Staar | 179/100.2 T |
| 2,782,398 | 2/1957 | West | 340/174.1 C |

*Primary Examiner*—Bernard Konick
*Assistant Examiner*—Jay P. Lucas
*Attorney*—Waters, Roditi, Schwartz & Nissen

[57] ABSTRACT

A mechanism is provided for controlling the advance of a record support and the displacement and direction of an oscillating recording and reading head. The record support carries two rows of track marks controlling through the action of an optical means the displacement of the record support while determining at the same time the direction of the head displacement. The record support may be constituted of reflective material or coated therewith and the two rows of track marks are non-reflective and arranged successively to provide three sets of signals in the optical means.

9 Claims, 15 Drawing Figures

APPARATUS FOR CONTROLLING ADVANCE OF A RECORD SUPPORT AND TRANSVERSE DISPLACEMENT OF A SENSING HEAD

BACKGROUND OF THE INVENTION

The present invention relates to a mechanism both for controlling the movement of a record support and the direction of displacement of a head, in recording devices adapted to effect recording and reading, transversely with regard to the advancement movement of the support.

In the known apparatus, the tape support is provided along its edges with perforations engageable by penetrating teeth of a ratchet wheel actuated by a shaft driven by a motor.

On the other hand, in dictating machines, playback and recording is transverse to the alternate movements of the respective head, the direction of displacement of the head being dependent on the position of perforations provided in a magnetic support and utilized for causing the advance of a magnetic tape in response to the control.

Thus, for instance, each perforation may correspond to the displacement direction of said head from left to right and the position of the tape between two perforations may correspond to the displacement direction of said head from right to the left.

This mechanical shifting involves the risk that the tape can become mutilated. Moreover, the perforations have to be provided in regular spacing from each other, to insure the respective control for the extremely great mechanical precision.

SUMMARY OF THE INVENTION

The control mechanism according to the invention is characterized in that the record support is provided with track marks which are disposed in such a manner that their character and their combination enables them to effect by the action of non-mechanical means the shifting movement of the record support to determine the displacement direction of the head.

The use of said track marks on the tape of said record support makes it possible to increase the information, especially since said track marks can be sensed more easily than said perforations of the prior art devices.

On the other hand, proper functioning does not require any extreme mechanical precision and tapes may be obtained in a stage making them appropriate for use even when they have been prepared in a less expensive process and by simpler production means.

In a practical embodiment of this invention, the non-mechanical means is an optical means. In this case, there are provided on the record support two rows of said track marks, of non-reflective character whereas the support is reflective. The track marks also may be reflective, in which case the support is non-reflective. The track marks are disposed in two parallel rows at one of the edges of the magnetic support and the marks extend perpendicular to the axis of this support.

DETAILED DESCRIPTION

Figure 1:
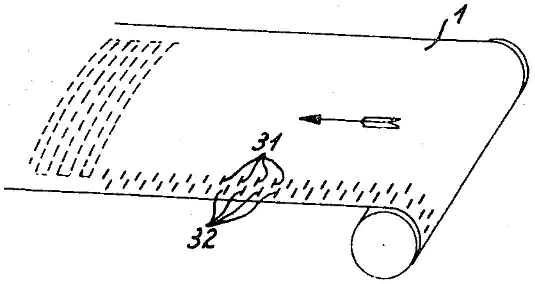
FIG. 1 is a diagrammatic perspective view showing the record support according to the invention.

Referring to the drawing, therein is seen a recording tape which travels in the direction of the arrow in FIG. 1 and above which is mounted an arm 2 carrying a record-playback head 3, the arm 2 being oscillatable in a horizontal plane about a vertical axis 4.

The arm 2 also carries an electrical motor 5 of the type described in Belgian Pat. No. 606,675 and U.S. Pat. No. 3,254,245. The motor 5 drives the arm 2 in its oscillating movement. The motor rotates continuously and drives a capstan wheel 6 which comes alternately into contact with the walls of a slot 7 provided within a slide 8 in a manner to be explained later.

The wheel 6 is carried by a vertical shaft 9 driven by a pinion 10 engaged with a worm 11 on a shaft 12 extending within arm 2.

The displacement of wheel 6 to contact one or the other of the walls of the slot 7 of the slide is determined by electro-magnetic relays 13 and 14 disposed perpendicularly with respect to a lever 15 connected by a pivot 16 to a plate 17 integral with slide 8.

The lever 15 is pivotal about a pin 18 affixed to the housing.

Figures 10, 11, 12, 15:
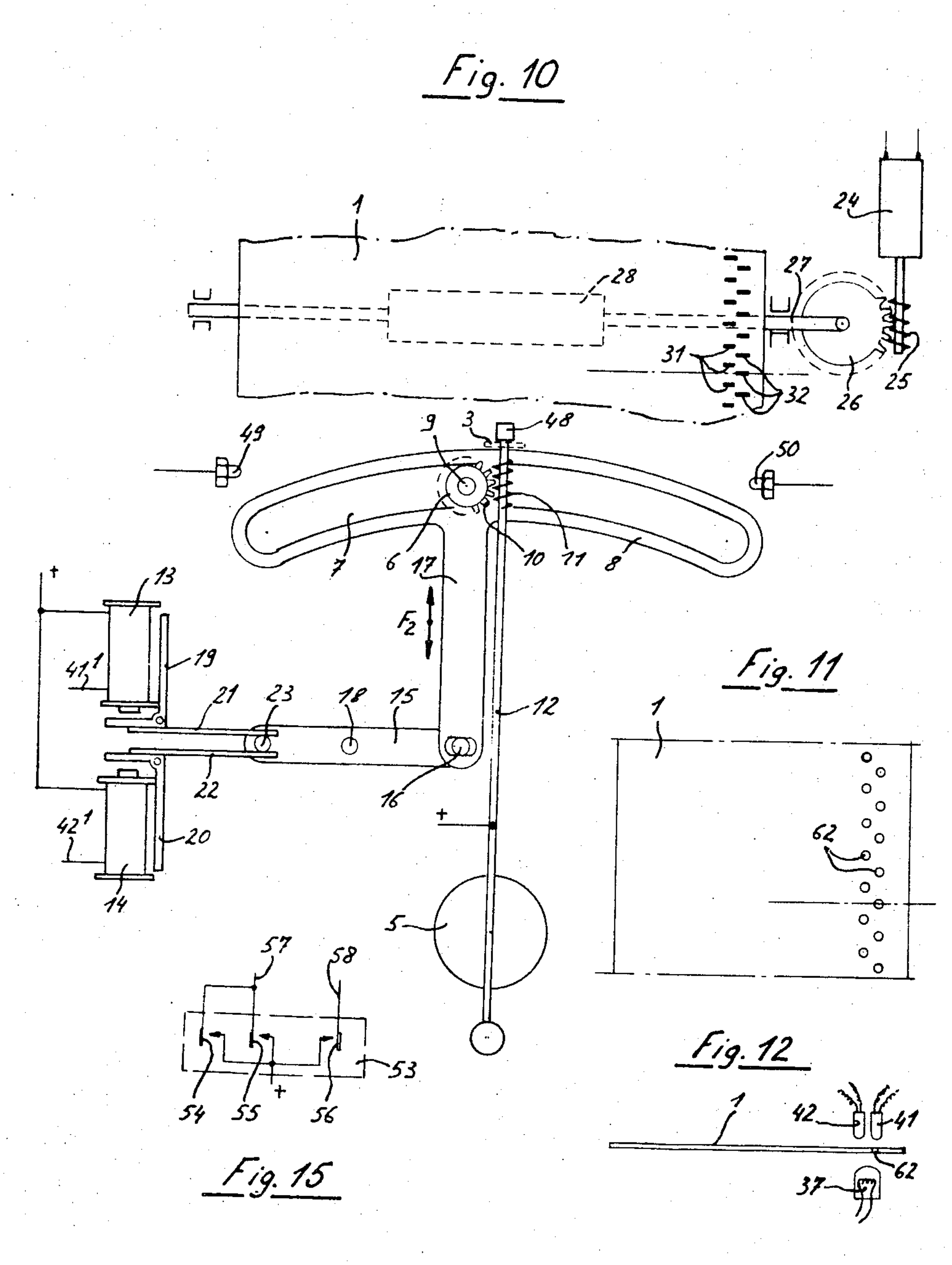
FIG. 10 is a plan view showing a portion of the record support and the drive means therefor.
FIG. 11 is a plan view of a detail of the apparatus for swinging a sensing head.
FIG. 12 shows in elevation and plan a modified arrangement of marking means and optical sensing arrangement.
FIGS. 13–15 are circuit diagrams of the control apparatus according to the invention.

The relays 13 and 14 each include one armature, 19 and 20, respectively, which are integral with arms 21 and 22 and are capable of displacing a head bolt 23 carried by the lever 15 in a manner such that if either one or the other of the relays is energized, plate 17 will be displaced in one or the other of the directions indicated by arrows $F_2$ in FIG. 10.

Figures 2, 3:
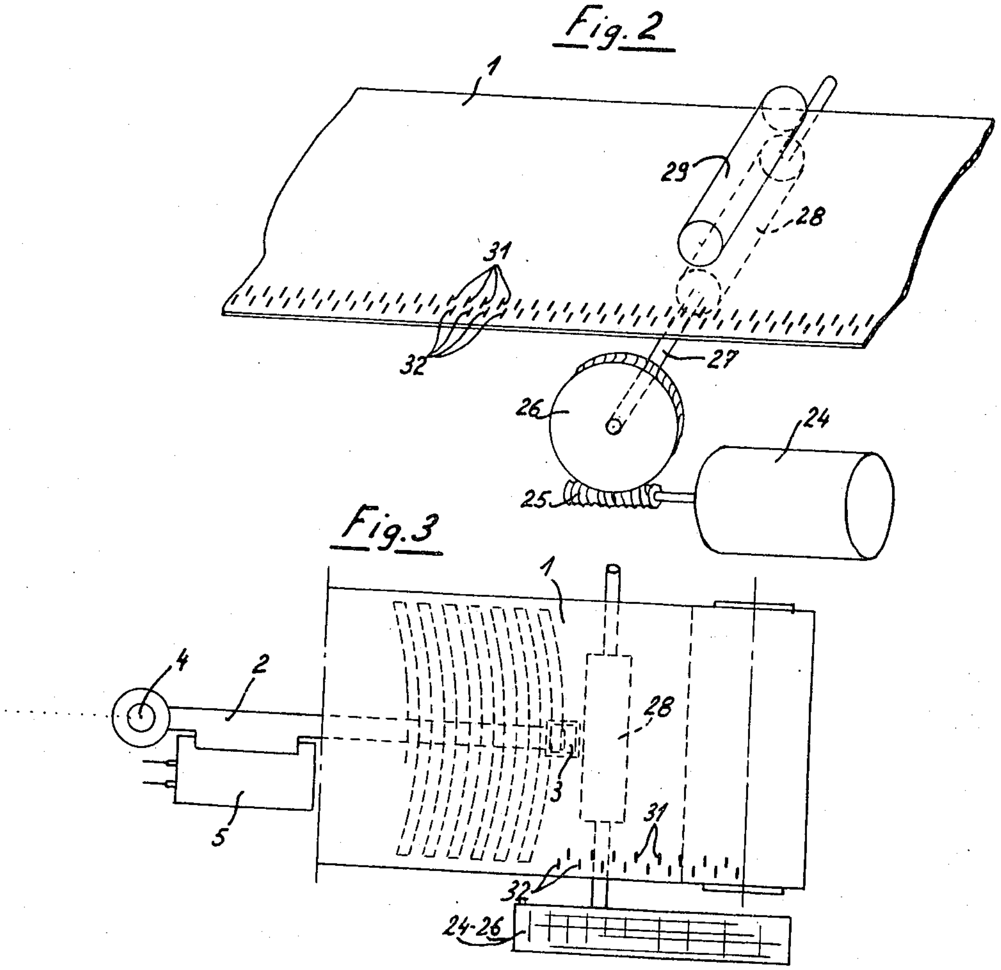
FIG. 2 diagrammatically shows the record support with a drive means therefor.
FIG. 3 is a plan view of the apparatus according to the invention.
Figure 4:
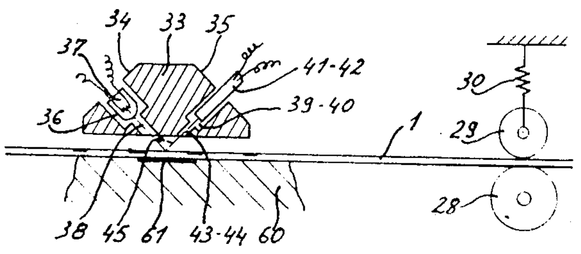
FIG. 4 is an elevation view partly in section of a portion of the apparatus.
Figure 5:
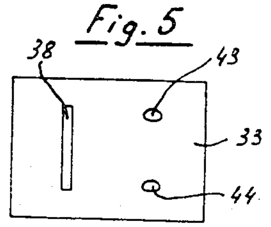
FIG. 5 is a plan view of a block for optical devices according to the invention.
Figure 6:
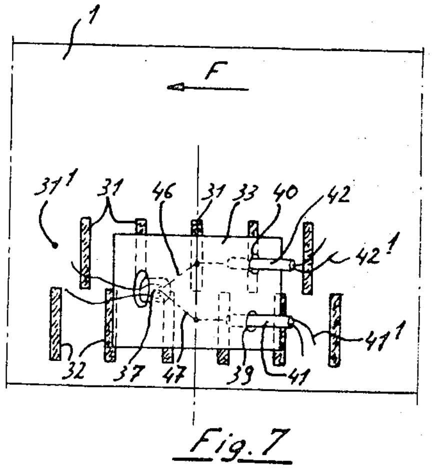
FIG. 6 is a side sectional view of said block.

The advance of the tape is controlled and achieved by a motor 24 (see FIGS. 2 and 10), whose shaft carries a worm 25 engaged with a toothed pinion 26 attached to a shaft 27 carrying a rotating roller 28 which can approach and contact the magnetic tape 1 and which cooperates with a pressure roller 29 biased by a spring 30 (FIG. 4).

According to the invention, the tape 1 is provided with track marks 31 and 32 disposed in a manner such that their character and their combination enables them to provoke by non-mechanical means the advance of the tape 1 while at the same time determining the direction of displacement of the head 3.

In the illustrated embodiment, this non-mechanical means is an optical means. In order to ensure the operation of the entire arrangement, the tape 1 is constituted of a reflective material or is coated with such material, and said optical means is constituted by the two rows of track marks 31 and 32 which are made non-reflective and are arranged parallel to one another along one of the edges of the tape. The marks extend perpendicular to the longitudinal axes of the tape.

Fixedly mounted at a small distance above the rows of marks on the tape 1 is a sensing head 33 (FIG. 4) which is provided with two oppositely inclined walls 34 and 35. A recess 36 is formed in wall 34 and receives an electric lamp 37, the recess 34 extending to an inclined narrow bore 38 which opens at the lower surface of head 33. The other inclined wall 35 is provided with two recesses 39 and 40 accommodating two photoelectrical cells 41 and 42. The recesses 39 and 40 extend to bores 43 and 44 which open at the lower surface of head 33.

The bore 38 and the bores 43 and 44 are positioned and inclined in mutual relation in a manner such that the axes of the bores 43 and 44 and the axis of bore 38 define therebetween an angle of reflection 45 whose apex lies on the tape 1. The marks 31 and 32 on the tracks are longitudinally offset as shown in FIG. 7.

Thus light rays issuing from the electric lamp 37 extend in a narrow path across both rows at beams 46 and 47, and at any one time one of said beams can illuminate one of the marks on tracks 31 and 32, while the other beam illuminates the reflective surface of said tape. Thus, as seen in FIG. 7 beam 46 illuminates track 31 while beam 47 illuminates the reflective tape surface. Since the thickness of the marks is less than the spacing between marks, there is a period during the tape advance when both beams illuminate the reflective surface of the tape.

Figure 7:
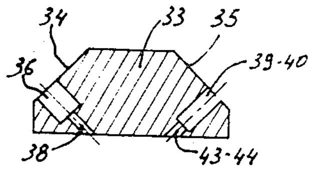
FIG. 7 is a plan view of a portion of the record support and the optical system in a first stage of advancement.
Figure 8:
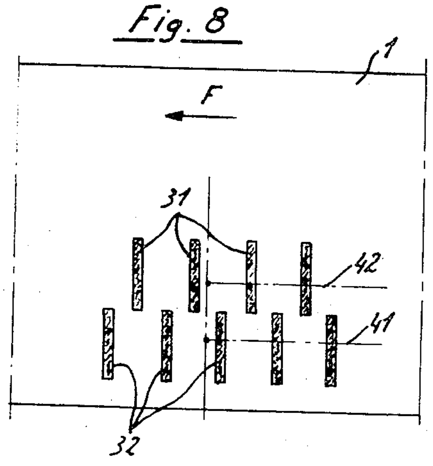
FIG. 8 shows the record support in a second stage of advancement.
Figure 9:
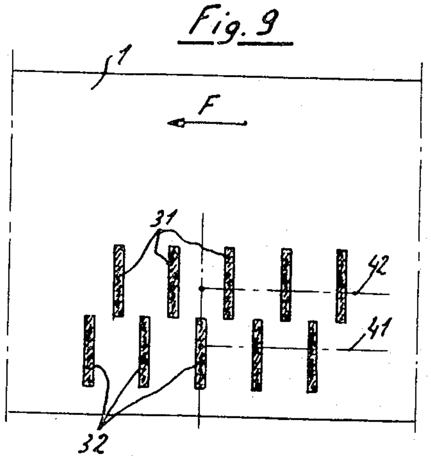
FIG. 9 shows the record support in a third stage of advancement.

Referring now to FIGS. 7–9, therein the tape 1 is assumed to be moving in the direction indicated by the arrow F, and there exist three different states:

1. In a first position, the beam 46 strikes one track mark 31 and is not reflected to the photoelectric cell 42 (FIG. 7).

2. In a second position, the beams 46 and 47 both strike a reflective portion of the tape and are reflected to cells 41 and 42 (FIG. 8).

3. In a third position, the beam 47 strikes one of the track marks 32 and is not reflected to the photoelectric cell 41 while beam 46 strikes a reflective portion of the tape and is reflected to cell 42 (FIG. 9).

The mechanism according to the invention is therefore adapted to produce three types of signals, each of which pertains to a determined function.

When the magnetic tape is in movement, the beams will strike the first track mark 32 and the reflective surface portion 31' in the other row of track marks. The beam 46 will be reflected to the photoelectric cell 42.

This causes cell 42 to become conductive and allow current flow to conductors 42' connected to the winding of the relay 14. The relay 14 becomes energized and attracts the armature 20 to cause the arm 22 to move and swing lever 15 about the pivot 18 so that the plate 17 pushes the wheel 6 to engage one of the walls of the slot 7 within the slide 8.

Figure 13:
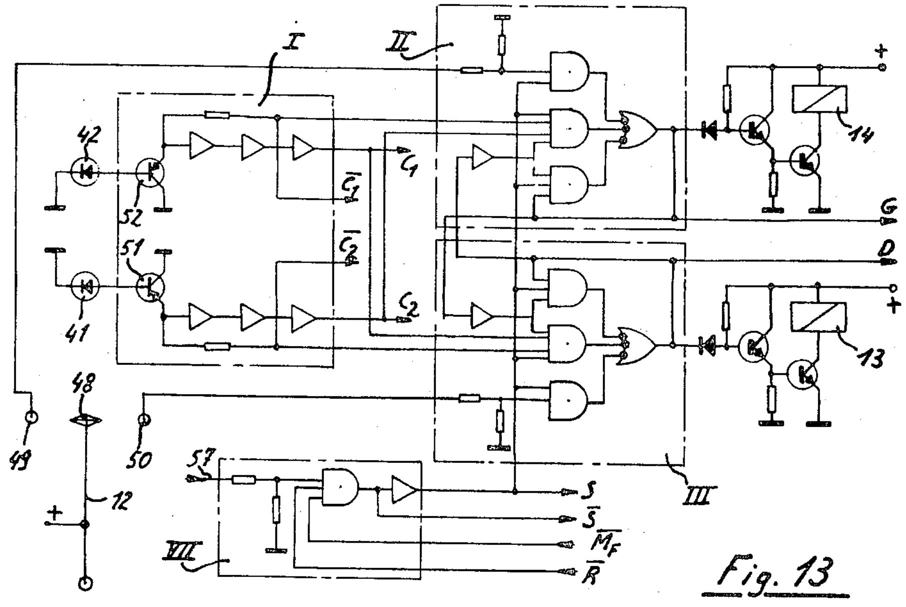

The wheel 6 which is driven by the motor 5 in constant rotation now causes a displacement of the arm 12 to the left to the end of the possible travel within the slot 7 whereat an abutment terminal 48 operates a contact 49 to terminate the travel (see FIG. 13).

The contact of abutment terminal 48 and contact 49 has the following effect:

1. Relay 14 is deenergized which stops the travel of head 3.

2. Motor 24 is driven in rotation to cause an advance of the magnetic tape.

In consequence of the advancement of the tape, the marks on the track assume the position shown in FIG. 8 wherein the beams 46 and 47 cause the two photoelectric cells 41 and 42 to become conductive which prolongs the advancement signal to the motor 24 via the contact 49.

The tape continues advancing in the direction of the arrow F and the marks of the optical system arrive at the position shown in FIG. 9. At this instant cell 41 becomes non-conductive and the cell 42 conductive which causes the motor 24 to stop, and the relay 13 to become energized.

In the manner as previously explained, the wheel 6 engages the opposite wall of the slot 7 and the reading head is displaced from the left to the right.

After the reading head has reached the end of travel at the right side, there is established contact between terminal 48 and contact 50 and the cycle is restarted in the opposite direction.

It is within the contemplation of this invention to apply the track marks 31 and 32 by printing on the tape or they may be in the form of small apertures 62 as shown in FIG. 11. In FIG. 12 it can be seen that apertures 62 are disposed in two rows and permit passage of light from lamp 37 situated on one side of tape 1 to cells 41 and 42 situated on the other side of the tape 1.

The operation is then the same as that illustrated by FIGS. 4–9.

Although the embodiment described considers the tape to be reflective, while the track marks are non-reflective, it is obvious, that the arrangement can be reversed, namely the track marks be reflective and the tape non-reflective.

Figure 14:
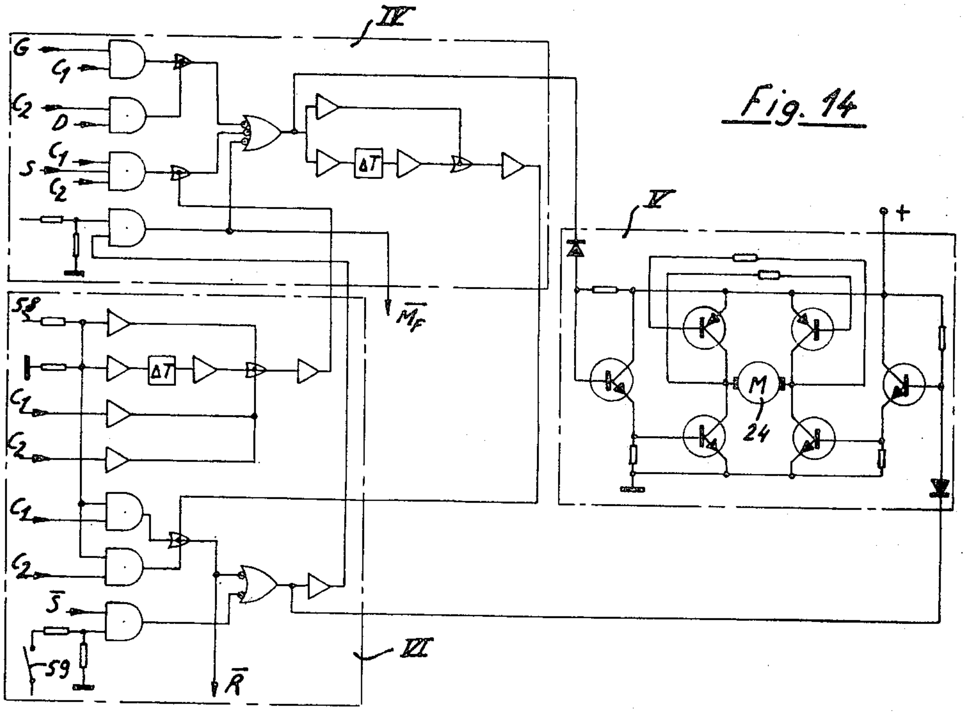

The operational states will next be considered with reference to the electronic circuitry in FIGS. 13–15.

The electronic circuit includes an interruptor switch 53 (FIG. 15) which comprises contacts 54, 55, 56. The contacts 54 and 55 are coupled by a lead 57 to a block VII (FIG. 13 producing a general operational order, either to run or to stop, the block 47 being connected by connectors S, $\overline{S}$, $\overline{M}$, and $\overline{R}$ (FIG. 13) to the blocks II-III-IV-VI preventing the usual functioning of the phases which will be discussed in the following:

1st Phase

The optical system constituted by the cells 41 and 42 actuates the amplifier I composed of two transistors 51 and 52 and an integrated circuit.

The electronic information obtained therein selectively acts on the blocks II and III which constitute a flip-flop system.

The systems of the blocks II and III respectively operate, through voltage amplifiers, the relays 13 and 14 which in turn provoke the corresponding displacement of the reading head.

2nd Phase

At the moment in which the arm 12 reaches the end of its travel either to the left or to the right, contact is established respectively between the terminal 48 and contact 49 or the terminal 48 and contact 50, which occurrence then affects the blocks II and III.

If contact has occurred between terminal 48 and contact 50, the block III is activated and causes the relay 13 to become energized. Due to the flip-flop effect, the block III also acts on the block II in a manner such that relay 14 is deenergized.

On the other hand, under the action of block III, the block IV issues a signal to the motor 24 to start running, by supplying through a voltage amplifier system connected in a bridge circuit (block V) current current to the motor 24 to cause advance of the tape.

3rd Phase

Whenever the optical system detects a new state, there is generated through I and IV a cancelling signal supplied to V which signal countermands the order to rotate the motor 24.

Now, no current is fed to the motor 24 so that the tape is stopped in view of the newly occurred optical state.

Consequently, return is made to the second phase with the single difference that the action of II cancels the action of III.

Retreat

Within the interruptor switch 53, the actuation of the contact 56 acts, through the lead 58, on the block VI (FIG. 14) which block in turn sends to block V a retreat signal which also influences block VII in a manner such that by means of II and III the relays 13 and 14 are deenergized.

At the end of the retreat signal, the optical system will determine whether excitation is to be made either of relay 13 or relay 14.

In order to prevent the tape after it has been fully unwound from leaving the support reel, there may be provided two track marks 31 and 32 situated in alignment adjacent each other. In this case, the two cells 41 and 42 do not transmit any signal and the operation of the device is stopped.

The same security provision is effective in case the lamp 37 is defective.

In the case where no tape is present between the block 33 and the support 60, the space between them is free and the light rays strike a non-reflective portion 61 on block 60 and the device is stopped.

What is claimed is:

1. In combination, a displaceable support member for recorded media, means for displacing said support member, a head supported adjacent said support member for travel transversely of the direction of displacement of the support member to record or playback the media on the support member, marking means on said support member in a predetermined array, and nonmechanical sensing means operative with said marking means for controlling the operation of said means which displaces the support member, and the operation of said head and its direction of travel, said non-mechanical sensing means comprising an optical system including photocell detection means, one of said marking means and support member being light reflective whereas the other is not, said photocell detection means being positioned to sense the presence of the marking means, said marking means comprising two rows of parallel track marks extending in the direction of displacement of the support member, said optical system further comprising a fixed block adjacent the support member in the path of travel of said marks, and a light source in said block for illuminating the support member in the region of the marks, said photocell detection means comprising two photocell detectors in said block, one for each track, and positioned to receive a light beam from said light source reflected by said marks or support member, said block having a bore for passage of light from said light source at an acute angle onto said rows of marks, said block having two further bores, each leading to a respective photocell, said bore for the passage of light from said source producing a narrow light beam extending across each track in the space between adjacent marks, said marks in the tracks being longitudinally offset so that the photocell detectors sense in succession, during travel of the support member, a mark on one track and a blank on the other, and a blank on the first track and a mark on the second, in response to which marks, the support member stops in one position and said head travels in corresponding direction across the support member until said head reaches its end of travel whereupon the support member moves to the next mark combination on the support member at which time the support member stops again and the head travels across the support member in opposite direction.

2. The combination as claimed in claim 1 wherein said means for displacing said support member comprises a motor, and a drive member engageable with said support member and drivable by said motor to advance the support member.

3. The combination as claimed in claim 1 wherein said support member is a tape, said marks being printed on said tape.

4. The combination as claimed in claim 1 wherein said support member is a tape, said marks being constituted as apertures in said tape, said detectors and light sources being positioned on opposite sides of the tape.

5. The combination as claimed in claim 1 comprising means for transverse displacement of said head including an oscillatable assembly supporting said head, a motor for driving the assembly, said assembly including a capstan wheel driven in rotation by said motor, a displaceable lever having a slot accommodating said capstan wheel with clearance, and electromagnetic means coupled to said photocell detection means for displacing the lever to cause the capstan wheel to contact a wall of the slot and produce travel of the wheel in the slot.

6. The combination as claimed in claim 5 wherein said photocell detection means has two operative states for displacing said lever in two directions which selectively displace the assembly in opposite directions.

7. The combination as claimed in claim 6 wherein said support member is a tape and the means for displacement thereof comprises a motor, gear means driven by said motor, and rollers in contact with the tape on opposite surfaces thereof, one roller being driven from said motor via said gear means, said motor being operated in accordance with the marking means on the tape.

8. The combination as claimed in claim 6 wherein said electromagnetic means comprises a pair of relays each displacing the lever in an opposite direction when energized.

9. The combination as claimed in claim 8 wherein said assembly includes switch means both for interrupting energization of the active relay when the capstan wheel reaches the end of travel in the slot, and for activating said means which displaces the support member, said marking means having successively recurring first and second stages, said means for displacing the support member being rendered inoperative when a successive state is detected by the photocell detection means which then assumes one of its two states to commence swinging of said assembly.

* * * * *